United States Patent [19]

Pritchard

[11] Patent Number: 4,577,225

[45] Date of Patent: Mar. 18, 1986

[54] PROGRESSIVE SCAN VIDEO PROCESSOR HAVING COMMON MEMORIES FOR VIDEO INTERPOLATION AND SPEED-UP

[75] Inventor: Dalton H. Pritchard, Princeton, N.J.

[73] Assignee: RCA Corporation, Princeton, N.J.

[21] Appl. No.: 646,104

[22] Filed: Aug. 31, 1984

[51] Int. Cl.[4] .......................... H04N 7/01; H04N 5/68
[52] U.S. Cl. .................. 358/140; 358/21 R; 358/242
[58] Field of Search ............... 358/140, 134, 152, 166, 358/242, 12, 21 R

[56] References Cited

U.S. PATENT DOCUMENTS

| 3,830,971 | 8/1974 | van de Polder | 358/140 |
|---|---|---|---|
| 4,322,750 | 3/1982 | Lord | 358/140 |
| 4,364,090 | 12/1982 | Wendland | 358/140 |
| 4,400,719 | 8/1983 | Powers | 358/21 R |
| 4,415,931 | 11/1983 | Dischert | 358/242 |
| 4,480,267 | 10/1984 | van den Avoort | 358/140 |
| 4,484,188 | 11/1984 | Ott | 358/140 |
| 4,539,592 | 9/1985 | Tanaka | 358/140 |

FOREIGN PATENT DOCUMENTS 2111343 6/1983 United Kingdom .

Primary Examiner—Howard W. Britton
Attorney, Agent, or Firm—P. J. Rasmussen; P. M. Emanuel; R. G. Coalter

[57] ABSTRACT

A processor, for providing a double line-rate video signal comprising alternating received lines and interpolated lines, comprises a triad of memories. As each incoming video signal is stored in one of the three memories, the remaining two are read at double the write clock rate. An output circuit interleaves a non-interpolated time compressed line of video obtained from one of the two memories being read with a time-compressed line of video obtained by interpolation from both of the two memories being read to provide a processed video output signal. The write-one read-two memory organization enables concurrent interpolation and speed-up of the video signal thereby minimizing potential clock timing problems inherent in progressive scan systems of the type where interpolation is provided separately either before or after video speed-up.

6 Claims, 6 Drawing Figures

| LINE | 4 | 5 | 6 | 7 | | | | |
|---|---|---|---|---|---|---|---|---|
| COUNT | 0 | 1 | 2 | 3 | 4 | 5 | 0 | 1 |
| MEM 32 | W4 | R4 | R4 | R4 | R4 | | W7 | |
| MEM 34 | R2 | R2 | W5 | | R5 | R5 | R5 | R5 |
| MEM 36 | R3 | R3 | R3 | R3 | W6 | | R6 | R6 |
| SWITCH 54A | 34 | 36 | 36 | 32 | 32 | 34 | 34 | 36 |
| SWITCH 54B | 34 | 34 | 36 | 36 | 32 | 32 | 34 | 34 |
| VIDEO OUT | 2 | $\frac{2+3}{2}$ | 3 | $\frac{3+4}{2}$ | 4 | $\frac{4+5}{2}$ | 5 | $\frac{5+6}{2}$ |

*Fig.6*

PROGRESSIVE SCAN VIDEO PROCESSOR HAVING COMMON MEMORIES FOR VIDEO INTERPOLATION AND SPEED-UP

FIELD OF THE INVENTION

This invention relates to video signal processors for progressive scan video systems of the type that convert line-rate interlaced video signals into double line-rate non-interlaced video signals and wherein added lines are obtained by interpolation.

BACKGROUND OF THE INVENTION

"Progressively" scanned television receivers have been proposed wherein the horizontal scan rate is multiplied, i.e., doubled, and each line of video is displayed twice thereby providing a displayed image having reduced visibility of line structure and subjectively improved vertical resolution. In a typical progressively scanned receiver, each line of video is stored in one of two memories. As a first of the memories is being written with the incoming video signal at a standard line rate, the second of the memories is read two times at twice the standard line rate thereby providing two lines of "speed-up" (time-compressed) video within one standard line interval. The second memory output is applied to a display having a doubled horizontal sweep rate synchronized with read-out of the memory thereby doubling the number of displayed lines of video signal. An example of such a progressively scanned receiver, wherein the added lines of video signal are replicas of the original scan lines, is described in U.S. Pat. No. 4,415,931 entitled TELEVISION DISPLAY WITH DOUBLED HORIZONTAL LINES which issued Nov. 15, 1983 to R. A. Dischert.

It has been recognized that a desirable reduction of certain artifacts (e.g., inter-line flicker, line break-up with motion, etc.) may be obtained in a progressively scanned receiver by interpolating the added lines of the video signal from the original signal. This may be done either before or after "speed-up" (i.e., time compressing) of the video signal in the memory. An example of a progressively scanned display system in which the additional scan lines are obtained by interpolation from the original scan lines prior to time compression or video "speed-up" is described by K. H. Powers in U.S. Pat. No. 4,400,719 entitled TELEVISION DISPLAY SYSTEM WITH REDUCED LINE SCAN ARTIFACTS which issued Aug. 23, 1983. An alternative of providing interpolation subsequent to speed-up of the video signal is described by Yasushi Fujimura et al. in UK Patent Application No. 2,111,343A published June 29, 1983. In these interpolating progressive scan receivers separate clocked memories (e.g., a CCD or a RAM) are connnected in cascade for providing the interpolation and speed-up functions.

SUMMARY OF THE INVENTION

It is herein recognized that the use of separate clocked memories in cascade for providing the functions of interpolation and time compression can result in a requirement for meeting very critical clock timing requirements. This problem arises because where memories are cascaded, the first memory in the cascade connection must "settle" before the information recovered from it can be written into the second memory and the settling time may comprise a significant portion of a clock cycle. The read clock in an NTSC processor, for example, typically operates at a frequency of about 28 MHz (i.e., eight times the color subcarrier frequency, $8f_{sc}$) and thus has a period of only about 36 nanoseconds. To meet this timing requirement, and to allow a reasonable margin for manufacturing tolerances, it may be necessary to resort to the use of multiphase clocks or to use special clock delay lines to properly time the operation of separate interpolator and time compressor memories.

The present invention is directed to meeting the need for an interpolating progressive scan video signal processor in which the aforementioned clock timing problems are substantially reduced. In accordance with the present invention, a processor includes parallel arranged common memories for providing the functions of interpolation and time compression of a video signal being processed.

BRIEF DESCRIPTION OF THE DRAWING

The invention is illustrated in the accompanying drawing, wherein like elements are denoted by like reference designators, and in which:

FIG. 6 is a timing diagram associated with FIGS. 4 and 5.

DETAILED DESCRIPTION

Figure 1:
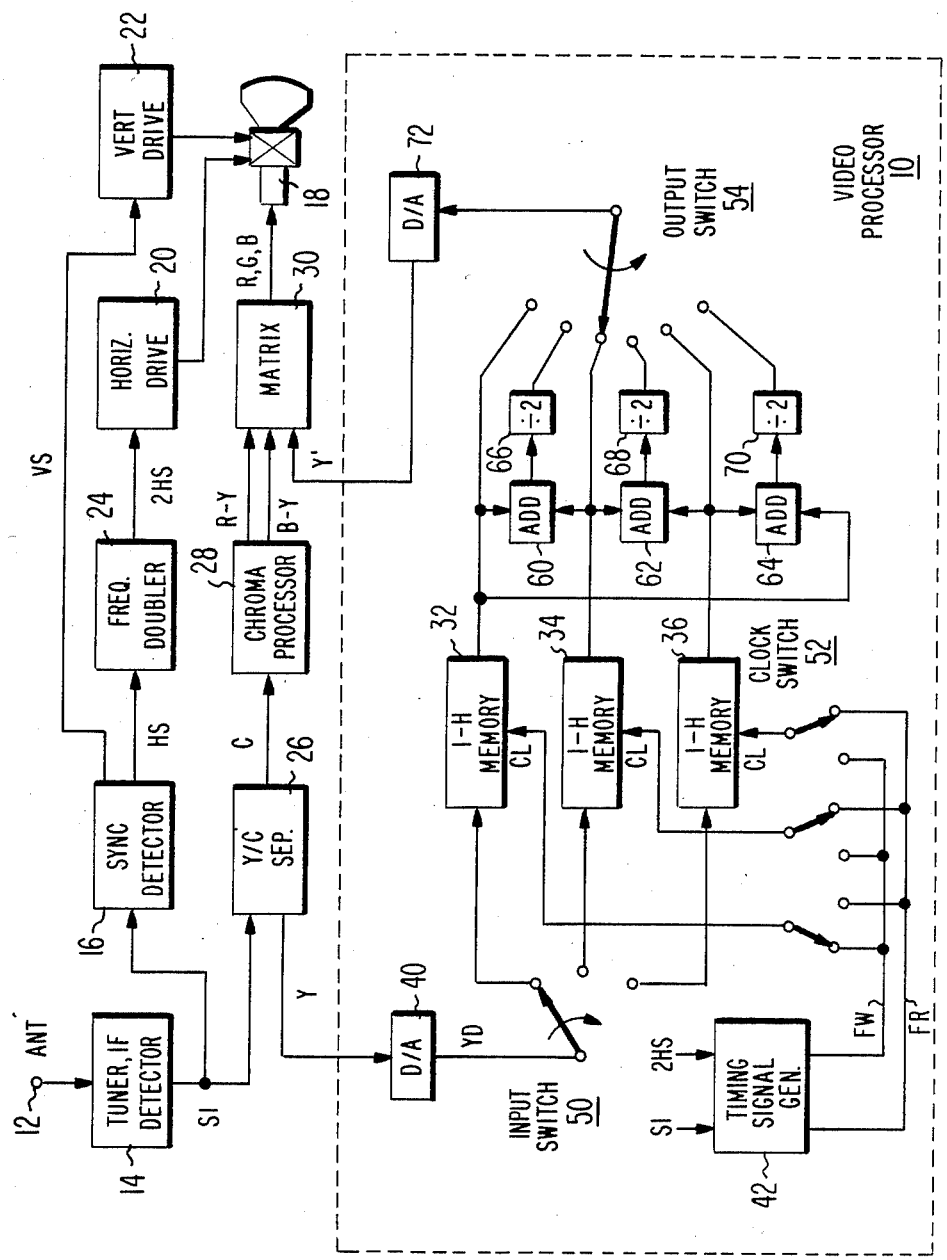
FIG. 1 is a block diagram of a television receiver having a processor embodying the invention.

The principles of the invention may be applied to the processing of component video signals such as Y, I, Q or R, G, B. In the specific example of FIG. 1, the video processor 10 (outlined in phantom) embodying the invention is used for providing interpolation and time compression of the luminance component, Y, of a video signal in an interpolating progressively scanned television receiver. The receiver includes an antenna terminal 12 coupled to a tuner/I.F./detector unit 14 of conventional design which processes RF input signals supplied to terminal 12 from a source (e.g., an antenna, tape recorder, disc player or the like) to provide a baseband composite video output signal S1. For purposes of illustration, it will be assumed that signal S1 is an NTSC standard interlaced signal having 525 lines per frame, two fields per frame, a field rate of about 60 fields per second, a line rate of about 15 KHz and a color subcarrier frequency of about 3.58 MHz. It will be appreciated, of course, that the principles of the invention apply also to other video signal formats (e.g., PAL multiplexed analog component type system, etc.)

The composite video signal S1 is applied to a synchronizing signal detector 16 which supplies horizontal (HS) and vertical (VS) synchronizing signals to the yoke of a kinescope 18 via horizontal and vertical drive units 20 and 22, respectively. The horizontal synchronizing signal HS is doubled in frequency by means of a frequency doubler 24 prior to being applied to drive unit 20 to thereby double the horizontal scan rate of kinescope 18. The field rate (60/sec) is unchanged whereby a raster is produced on kinescope 18 having 525 lines per field.

Signal S1 is also applied to a luminance/chrominance (Y/C) separator 26 (e.g., a comb filter) which separates the luminance and chrominance components and supplies the chrominance component C to a chroma processor 28 which provides the functions of line doubling and demodulation of the chroma signal and produces double line rate color difference signals R-Y and B-Y. The line doubling of the chroma signal could be performed by a processor similar to processor 10 if interpolation were desired. Chroma interpolation, however, is not necessary as a satisfactory color image may be obtained by merely repeating each line of chroma without any interpolation.

The luminance signal Y provided by separator 26 is applied to processor 10 which doubles the number of lines per field by inserting an additional line (obtained by interpolation) between each pair of received lines. The processed video signal Y' produced by processor 10 is at the double line rate and applied along with the double line rate color difference signals R-Y and B-Y provided by processor 28 to a matrix 30 which generates R, G and B drive signals for kinescope 18. The displayed image on kinescope thus comprises 525 lines per field with the added lines of chroma being replicas of the received lines (no interpolation) and the added lines of luma being interpolated versions of the received lines.

Processor 10, embodying the invention, includes a parallel type of arrangement of three one-line (1-H) clocked memories 32, 34 and 36. Illustratively, the memories may be either of the charge coupled device (CCD) type or the random access memory (RAM) type, both being well known. In this example of the invention, it will be assumed that memories 32, 34 and 36 are each RAM type devices.

The incoming or "received" luminance signal Y is converted to digital form (YD) for storage in memories 32, 34 and 36 by means of an A/D converter 40. Signal YD is sequentially applied to memories 32, 34 and 36 by means of a three position input switch 50 which is "stepped" or sequenced at the incoming line rate. For example, during the first line of a field, YD is coupled to memory 32. During the second and third lines, signal YD is coupled to memories 34 and 36, respectively. The sequence then repeats with signal YD being applied to memory 32 during the fourth line.

Read and write clock signals (FR and FW, respectively) for memories 32-36 are provided by a timing signal generator 42 which, as will be explained in connection with FIG. 2, also provides timed signals for operating switch 50, a clock switch 52 and an output switch 54 in processor 10. The read clock frequency FR is selected to be twice the write clock frequency FW. It is also convenient that the FR and FW be multiples of the color subcarrier frequency FSC to facilitate clock signal generation by relatively simple phase locked loops which produce signals locked frequency and phase to the color burst. Illustrative values are 4 FSC for FW or about 14 MHz (for NTSC signals) and 8 FSC or about 28 MHz for FR.

The read and write clock signals FR and FW are applied to memories 32-36 by means of a clock switch 52 that is operated synchronously with the input switch 50 under control of unit 42 as follows. When switch 50 applies the digitized luma signal YD to one of memories 32-36, then switch 52 applies the write clock FW signal to the clock input (CL) of the selected memory and simultaneously applies the read clock signal FR to the clock inputs of the remaining two memories. As a result, during the time interval that one memory is in the process of writing in a current line of the luma signal YD, the other two memories are reading out previously stored lines of the lunma signal YD twice. This follows since the read clock frequency is exactly twice the write clock frequency. For the switch positiions shown, memory 32 is coupled to receive the luma signal YD and the write clock signal FR while memories 34 and 36 are each coupled to receive the read clock signal FR. After the current line of luma is stored in memory 32, switch 50 is stepped to store the next line of luma in memory 34 and switch 52 is changed over to apply the write clock signal FW to memory 34 and to apply the read clock signal FR to memories 32 and 36. This cycle continues line by line throughout the field with two memories containing the two previously stored video signals being read while one memory is writing the currently received line.

The described parallel type organization of three memories which concurrently reads two previously stored lines while writing the current line is a significant feature of this invention. This organization facilitates generation of interpolated lines concurrently with the speed-up memory read/write operation using the same memory elements that provide video line doubling and significantly reduces the potential for timing errors to occur which is inherent in the previously discussed prior art systems which have memories organized in cascade or serial fashion and which provide interpolation prior to or after video speed-up.

Interpolation is performed by averaging the outputs of each pair of the three memories. This is done by connecting adders 60, 62 and 64 to the outputs of each pair of memories 32-34, 34-36 and 36-32, respectively. This provides the sum of each pair of lines. The average is obtained by dividing the sum by two in dividers 66, 68 and 70 connected to the respective outputs of adders 60, 62 and 64. In the case where memories 32-36 are CCD devices rather than RAM devices, the addition (summing) and division (attenuating by 6 db) may be provided by simple resistor networks.

The processed luminance signal Y' is obtained by means of an output switch 54 which sequentially selects one of the outputs of memories 32-36 and dividers 66-70 and applies the selected output to matrix 30 via a digital-to-analog converter 72. Switch 54 is controlled by timing signal generator 42 to advance (step) at twice the rate of switch 50. The phasing of switch 54 with respect to switch 50 is such that switch 54 "reads" the output of one of the memories and then reads the interpolated output of two of the memories during the time period that the third memory is being written.

Illustratively, for the switch position shown, switch 54 sequentially selects the outputs of memory 34 and divider 68 during the time that memory 32 is being written. When switch 50 advances one step to store the next incoming line in memory 34, switch 54 then advances to sequentially "read" the outputs of memory 36 and adder 70. The overall result is a sequence of lines is displayed on kinescope 18 that alternates between "real" lines provided by memories 32-36 and interpolated lines provided by dividers 66-70. If the incoming lines are denoted by A, B, C and D, then the output line sequence will be A, (A+B)/2, B, (B+C)/2, C, (C+D)/2, D and so on.

Figure 2:
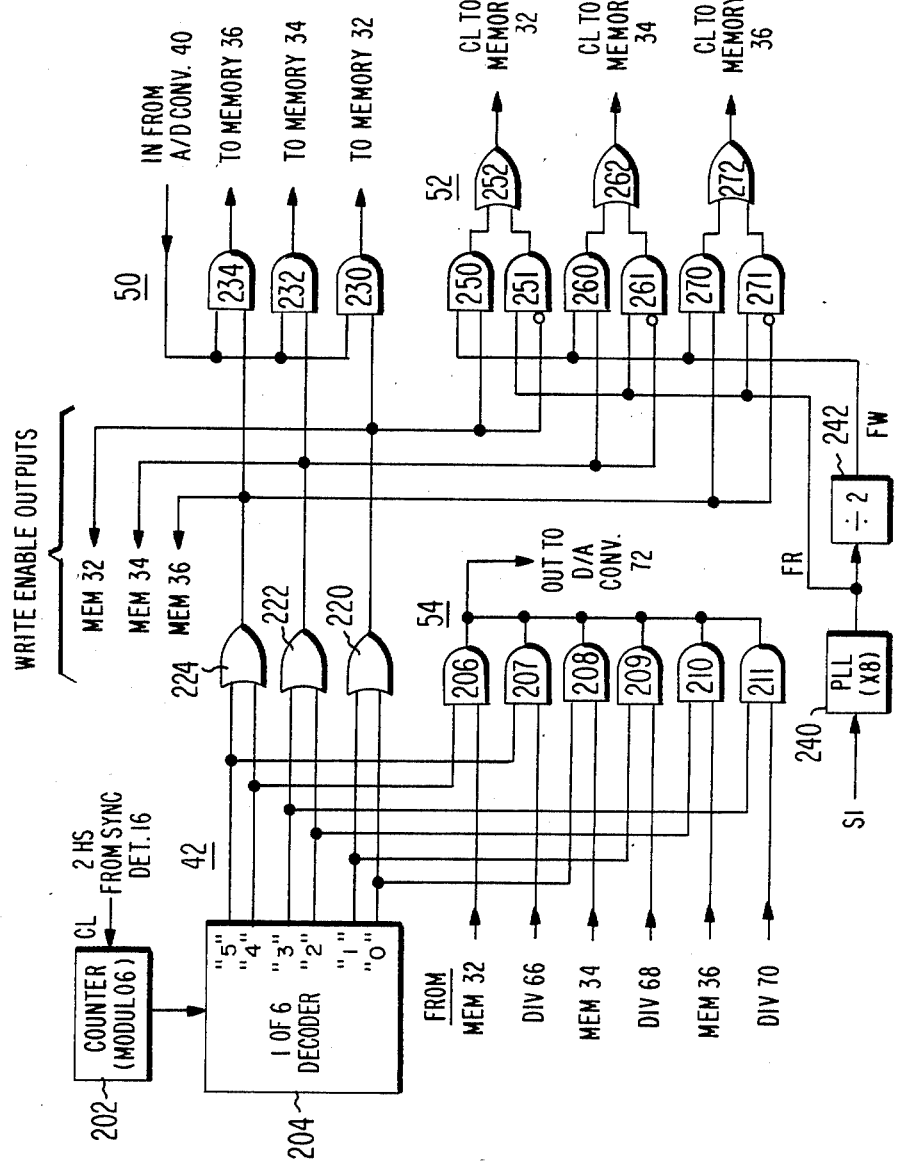
FIG. 2 is a detailed block diagram of a timing signal generator and switching arrangement suitable for use in the receiver of FIG. 1.

FIG. 2 is examplary of a suitable implementation of timing signal generator 42 and switches 50, 52 and 54. For clarity in the drawing, video signal buses are represented as single lines as was done in FIG. 1. Also, gates coupled to video lines are shown as single gates although in practice they would actually be parallel gates equal in number to the number of bus conductors.

Timing for operating all switches and generating memory write enable signals is provided by a modulo six (6) counter 202 which is clocked by the double line rate horizontal sync signal 2HS provided by sync detector 16. The output of counter 202 comprises a 3 bit binary word having six possible states. The counter advances one count for each horizontal line scan of kinescope 18. Two counts thus correspond to one line scan interval of the incoming video signal and one count corresponds to one line scan interval of the "speed-up" or processed video output signal.

Figure 3:
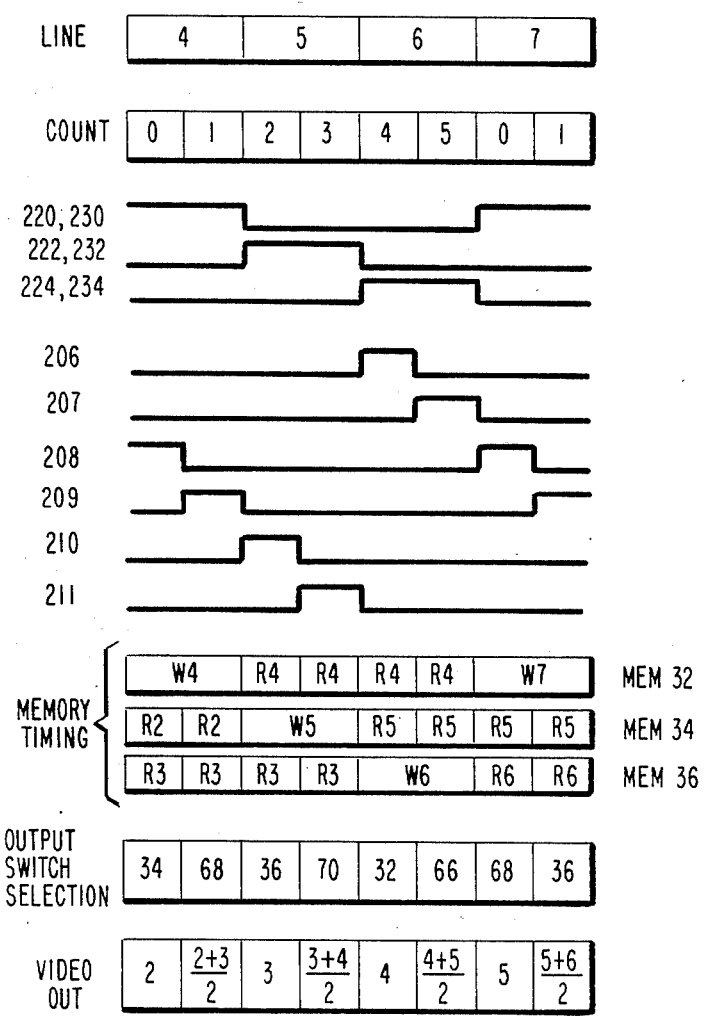
FIG. 3 is a timing diagram associated with FIGS. 1 and 2.

The count is decoded in a one-of-six (1 of 6) decoder 204 to thereby provide enabling outputs for six AND gates 206–211 which comprises output switch 54. Assuming that the video signal comprises 8 bits, each gate would be implemented as 8 parallel gates as previously noted. When using CCD type memories, gates 206–211 may be transmissiont gates. Note that the decoded outputs of decoder 204 are connected to gates 206–211 such that gate 208 is enabled during the interval that the count is zero ("0") thereby coupling the output of memory 34 to D/A converter 72. This corresponds to the condition of switch 54 shown graphically in FIG. 1. As the count progresses, gates 208–211 and 206–207 are sequentially enabled as shown in FIG. 3 where an enabled condition is signified by a high level of the waveform.

The decoded outputs of decoder 204 are additionally decoded by three OR gates 220, 224 and 226 to generate write enable for memories 32, 34 and 26 and control signals for input switch 50 at the incoming line rate. Switch 50 comprises three AND gates 230, 232 and 234. Gate 220 is enabled by the "0" and "1" outputs of decoder 204 and provides the write enable signal for memory 36 and an enable signal for gate 230. Gate 222 is enabled by the "2" and "3" outputs of decoder 204 and provides the write enable signal for memory 34 and the enable signal for gate 232 of switch 50. Gate 224 is enabled by the "4" and "5" outputs of decoder 204 and provides the write enable signal for memory 36 and enable signal for gate 234. The described sequence of enablement of gates 224–234 and generation of write enable signals is illustrated in FIG. 3.

The remaining elements of FIG. 2 illustrate how the read (FR) and write (FR) clock signals for memories 32-36 may be generated and how the clock switch 52 may be constructed. The read clock signal, FR, is provided by means of a multiplying phase locked loop 240 which receives the composite video signal S1 and locks an oscillator to eight times the frequency of the color burst component of signal S1. The write clock signal, FW, is produced by dividing signal FR by two in a divider 242. Switch 52 comprises three selection gates each comprised of a pair of AND and one OR gates. Signal FR is applied to one AND gate (251, 261, 271) of each selection gate and signal FW is applied to the other AND gate (250, 260, 270) of each selection gate. The outputs of each AND gate of each pair in a selection gate are applied to an OR gate to generate the memory clock signals. Specifically, gates 250 and 251 are coupled to gate 252, gates 260 and 261 are coupled to gate 262 and gates 270 and 271 are coupled to gate 272. The circles at the inputs of gates 251, 261 and 271 signify negative true logic. That is, the gate is enabled when the circled input is low. This is merely a shorthand way of signifying the presence of an inverter at the circled input.

Gates 250 and 251 are controlled by gate 220 such that during counts "0" and "1" gate 250 is enabled and gate 251 is disabled thereby applying the write clock FR to memory 32 during this time interval. At all other times gate 251 is enabled (gate 220 low) thereby applying the read clock to memory 32. The remaining gates are similarly controlled during subsequent lines (i.e., time intervals corresponding to counts "2", "3" and counts "4", "5").

Overall operation of processor 10 during four lines of the video input signal Y is summarized in FIG. 3. For illustrative purposes, the count of counter 201 is assumed to be zero at the beginning of line 4 of the video input signal, Y. As shown in the memory 32-36 timing diagram, memory 32 writes in line 4 as it is received, reads out the stored line four times during lines 5 and 6 and then stores line 7. As memory 32 is being written with line 4, memory 34 reads at the previously stored line 2 twice, writes in line 5 and then reads out line 5 four times as lines 6 and 7 are received. Memory 36 reads out a previously stored line 3 four times during the time lines 4 and 5 are received, writes in line 6 and then begins reading out line 6.

As shown in the output switch selection diagram, switch 54 selects the output of memory 34 when the count is zero. Thus, during the first half of incoming line 4, the video output signal corresponds to line 2 from memory 34. Since the read clock frequency is double that of the write clock, the recovered line 2 is "speeded-up" or "compressed" by a factor of two with respect to the incoming line rate. During count 1 switch 54 selects the output of divider 68 which contains the average of the lines stored in memories 34 and 36, namely, one half of the sum of lines 2 and 3. As switch 54 advances, the video output signal alternates between the compressed received lines and the compressed interpolated lines to form the output sequence shown in the "video out" diagram.

Figure 4:
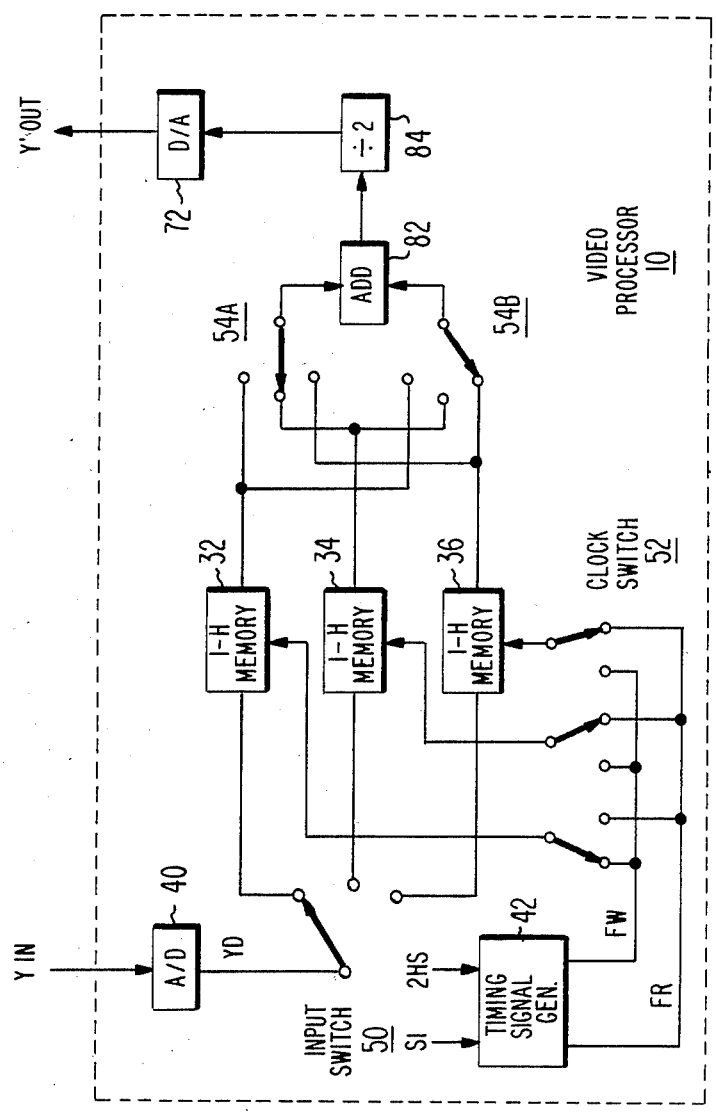
FIG. 4 is a block diagram illustrating a modification of the processor shown in FIG. 1.

FIG. 4 illustrates a desirable modification of processor 10 for reducing the number of adders and dividers. The modification comprises replacing adders 60–64, divider 66–70 and switch 54 with a single adder 82, a single divider 84 and two switches 54A and 54B. Generator 42 is also modified as will be explained. Switches 54A and 54B each have three inputs connected to respective ones of the outputs of memories 32, 34 and 36. The outputs of switches 54A and 54B are connected tp the inputs of adder 82 which has an output coupled via divider 84 to the input of D/A converter 72. For any position of switches 54A and 54B, adder 82 and divider 84 average the switch output signals (i.e., sum and divide by two). As a first example, if switch 54A is coupled to receive line "X" from one memory and switch 54B is coupled to received line "Y" from a different memory, then the divider 84 output is an interpolated or averaged line $(X+Y)/2$. If, however, both switches are coupled to the same memory containing, say, line X, then the output is $(X+X)/2$ or simply X. Thus, even though all output signals pass through adder 82 and divider 84, these elements function as a two-point interpolator if the input signals differ, and function as a "conduit", so to speak, if the input signals are the same.

In operation, the input switch 50 and clock switch 52 function as previously described to sequentially write the incoming video signal (YD, in this case) into memories 32–36. Switches 54A and 54B couple adder 82 to the memories in the sequence shown in FIG. 6 by the timing diagrams labeled "switch 54A" and "switch 54B". During count "0" (the first half of line 4) switches 54A and B couple both inputs of adder 82 to the output of memory 34 to receive line 2 previously stored therein. Since the "average" of line 2 is line 2, the video output during count "0" is line 2. During count "1", the inputs of adder 82 are coupled to the output of memories 34 and 36 to receive lines 2 and 3, respectively. The video output is thus a two-point interpolation or average of these lines, namely, (line 2+line 3)/2 as indicated. This process repeats, as shown, so that the resultant video output signal alternates between speeded-up (compressed) "real" (received) lines and speed-up "interpolated" lines as shown. This is the same sequence as in FIG. 3 but fewer adders and dividers are required thereby reducing the cost and improving the reliability (by parts count reduction) of the processor.

Figure 5:
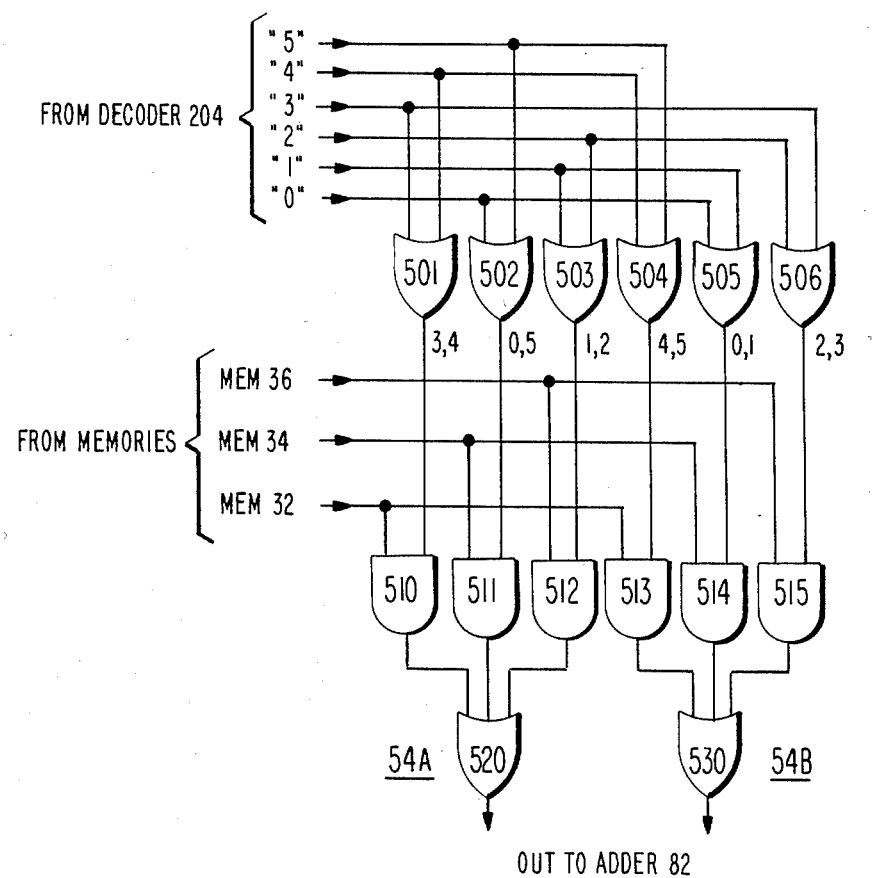
FIG. 5 illustrates a modification of FIG. 2.

FIG. 5 illustrates how FIG. 2 may be modified to implement switches 54A and 54B and to generate appropriate switch timing signals. The timing signals are generated by means of six OR gates 501–506 coupled to the outputs of decoder 204 as shown. Switch 54A comprises three AND gates 510–512 coupled to an OR gate 520. Switch 54B comprises three AND gates 513–515 coupled to an OR gate 530. Each gate, as previously explained, may actually comprise a number of parallel gates equal to the number of conductors of the video bus.

Gates 510, 511 and 512 couple the couputs of memories 32, 34 and 36, respectively, to adder 82 via OR gate 520 when enabled by OR gates 501, 502 and 503, respectively. Gates 513, 514 and 515 couple the output of memories 32, 34 and 36 to the other input of adder 82 via OR gate 530 when enable by OR gates 504, 505 and 506, respectively. Gates 501–506 are coupled to the decoder 204 outputs to enable gates 510–515 in accordance with the switch timing indicated in FIG. 6. As an example, gates 502 and 505 enable gates 511 and 514, respectively, when the count is "0" thereby coupling both inputs of adder 82 to the output of memory 34 to thus provide a non-interpolated line "2" video output signal. During count "1" gates 503 and 505 enable gates 512 and 514 thereby coupling the outputs of memories 36 and 34 to adder 82 to provide the interpolated line (2+3)/2 video output signal. The remaining gates are similarly connected, as shown, to provide the switch sequence shown and previously discussed in connection with FIG. 6.

What is claimed is:
1. A progressive scan processor, comprising:
a source of video input signal;
memory means including three memory locations each having a storage capacity of one line of said video input signal and organized in a parallel arrangement;
memory control means for sequentially causing each one of said memory locations to write in a current line of said video signal a line at a time at a first clock rate and for causing two previously stored lines to be read from two of said memory locations at a second clock rate while said video signal is being written into one of said memory locations to provide two time compressed video output signals; and
output means coupled to said memory means and responsive to said two time compressed video output signals for providing a processed video output signal in which alternate lines thereof are interpolated from said two time compressed video output signals.

2. A processor as recited in claim 1 wherein said output means includes a separate averaging circuit means coupled to said memory means for averaging each pair of time compressed video output signals read from said three memory locations in said memory means.

3. A progressive scan processor comprising:
a source of video input signal;
first, second and third clocked memory means, each having a storage capacity of one line of said video input signal;
input means for causing current lines of said video input signal to be written into said first, second and third memory means at a first clock rate a line at a time and for causing two previously stored lines to be read from two of said memory locations at a second clock rate while a current line is written into one of said memory locations to provide two time compressed video output signals; and output terminal; and
output means for forming an average of said two time compressed video output signals provided by each pair of said first, second and third memory means and for applying the averaged and a non-averaged time compressed video output signals to said output terminal during alternate line intervals.

4. A processor as recited in claim 3 wherein said output means includes a separate averaging means for each said pair of said first, second and third memory means.

5. A progressive scan processor, comprising:
a source of a video input signal;
first, second and third clocked memory means, each having a storage capacity of one line of a video input signal to be processed;
input means for applying current lines of said video input signal to input means of each of said memory means;
clock control means for sequentially applying a write clock signal to each of said memory means for sequentially writing said video input signal a line at a time into one of said memory means while concurrently applying a read clock signal of double the write clock signal frequency to two other of said memory means to provide a pair of time compressed video output signals and
output means including at least one averaging circuit means and at least one switch means coupled to said first, second and third memory means for forming a processed video output signal in which lines which are time-compressed but not formed by averaging and lines which are time-compressed and formed by averaging occur alternately.

6. A processor as recited in claim 5 wherein said output means comprises three of said averaging circuit means connected between respective pairs of said memory means and wherein said switch means has three inputs coupled to respective ones of said memory means, three further inputs coupled to respective ones of said averaging circuit means and an output for providing said processed video output signal.

* * * * *